United States Patent
Ogishita et al.

(10) Patent No.: US 11,906,749 B1
(45) Date of Patent: Feb. 20, 2024

(54) BALANCED AUGMENTED REALITY GLASSES WITH AUGMENTATION ATTACHMENTS

(71) Applicant: Sony Interactive Entertainment LLC, San Mateo, CA (US)

(72) Inventors: Naoki Ogishita, San Mateo, CA (US); Jeffrey R. Stafford, San Mateo, CA (US); Koichi Obana, San Mateo, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

(21) Appl. No.: 17/929,400

(22) Filed: Sep. 2, 2022

(51) Int. Cl.
*G02B 27/01* (2006.01)

(52) U.S. Cl.
CPC .. *G02B 27/0176* (2013.01); *G02B 2027/0178* (2013.01)

(58) Field of Classification Search
USPC .............................................................. 345/8
See application file for complete search history.

(56) References Cited

U.S. PATENT DOCUMENTS

| | | | |
|---|---|---|---|
| 10,659,869 B1* | 5/2020 | Bobuk | G02B 27/0176 |
| 2008/0143954 A1* | 6/2008 | Abreu | G06F 3/167 |
| | | | 351/158 |
| 2012/0075169 A1* | 3/2012 | Iba | G02B 27/0149 |
| | | | 345/8 |
| 2012/0200225 A1* | 8/2012 | Sawada | H05B 47/11 |
| | | | 315/151 |
| 2013/0076998 A1* | 3/2013 | Kakinuma | G02B 30/24 |
| | | | 359/464 |
| 2018/0052327 A1* | 2/2018 | Kamakura | G02B 27/0103 |
| 2020/0052254 A1* | 2/2020 | Ohshima | G02C 11/10 |
| 2021/0247617 A1* | 8/2021 | Kassner | G06F 3/017 |

OTHER PUBLICATIONS

"International Search Report and Written Opinion", dated Sep. 29, 2023 in the counterpart PCT application PCT/US2023/072260.

* cited by examiner

*Primary Examiner* — Chineyere D Wills-Burns
(74) *Attorney, Agent, or Firm* — John L. Rogitz; John M. Rogitz

(57) ABSTRACT

AR glasses are provided with left and right temples extending well behind the ears of the wearer to establish a center of gravity of the glasses that is approximately vertically above the front portion of the ears of the wearer. Rear segments the temples may be detachably engaged with the temples and may hold one or more electrical components.

20 Claims, 10 Drawing Sheets

Hinge : Can Be Closed For Mobile

Battery / Other Function Attachable Module Idea

The Module Could Be...

- Extra Battery
- Battery + Gyro Sensor
- Battery + Bone-Conduction Speaker
- Etc...

BALANCED AUGMENTED REALITY GLASSES WITH AUGMENTATION ATTACHMENTS

FIELD

The present application relates generally to balanced augmented reality glasses with augmentation attachments.

BACKGROUND

Certain computer simulations such as certain computer games may entail the use of augmented reality (AR) glasses to overlay virtual objects onto real world objects that can be seen through the glasses.

SUMMARY

An assembly includes a frame, left and right augmented reality (AR) lenses supported by the frame, and left and right temples extending posteriorly from the frame to posterior ends that, when the assembly is worn on the head of a wearer, are posterior to the ears of the wearer. A horizontal line through the center of gravity (CG) of the assembly is located superior to the ears and passes through in a vertical line passing through one of the ears.

In some embodiments, each temple includes a respective rear segment curved to generally match a curve of the skull of the wearer, and when the assembly is worn on the head of the wearer extend posteriorly on the wearer generally along the base of the skull. Each rear segment can define a respective posterior end, and the posterior ends can be separated from each other or can join together behind the head of the wearer.

In non-limiting examples each temple is hinged at a respective joint to pivot laterally to a wide configuration and to pivot medially to a narrow configuration in which when the assembly is worn by the wearer, the temples are closely juxtaposed to the skull of the wearer. Each joint can be located at a respective posterior end of a respective anteriormost segment of a respective temple.

In some implementations each rear segment is detachably engaged with a respective anterior part of the respective temple. Magnetic attraction may be used to connect each respective rear segment to the respective anterior part. One or more rear segment may house one or more of: at least one battery, at least one motion sensor, at least one speaker.

In another aspect, augmented reality (AR) glasses include left and right temples which, when the AR glasses are worn by a wearer, extend behind the ears of the wearer to establish a center of gravity (CG) of the AR glasses that is in a vertical line above a horizontal line passing through the ears of the wearer.

In another aspect, a method includes providing glasses wearable by a wearer and having left and right temples extending from a frame holding lenses, and configuring the temples to establish a center of gravity (CG) of the glasses that is in a vertical line above a horizontal line passing through the ears of the wearer when the glasses are worn by the wearer.

The details of the present application, both as to its structure and operation, can be best understood in reference to the accompanying drawings, in which like reference numerals refer to like parts, and in which:

DETAILED DESCRIPTION

Figure 1:
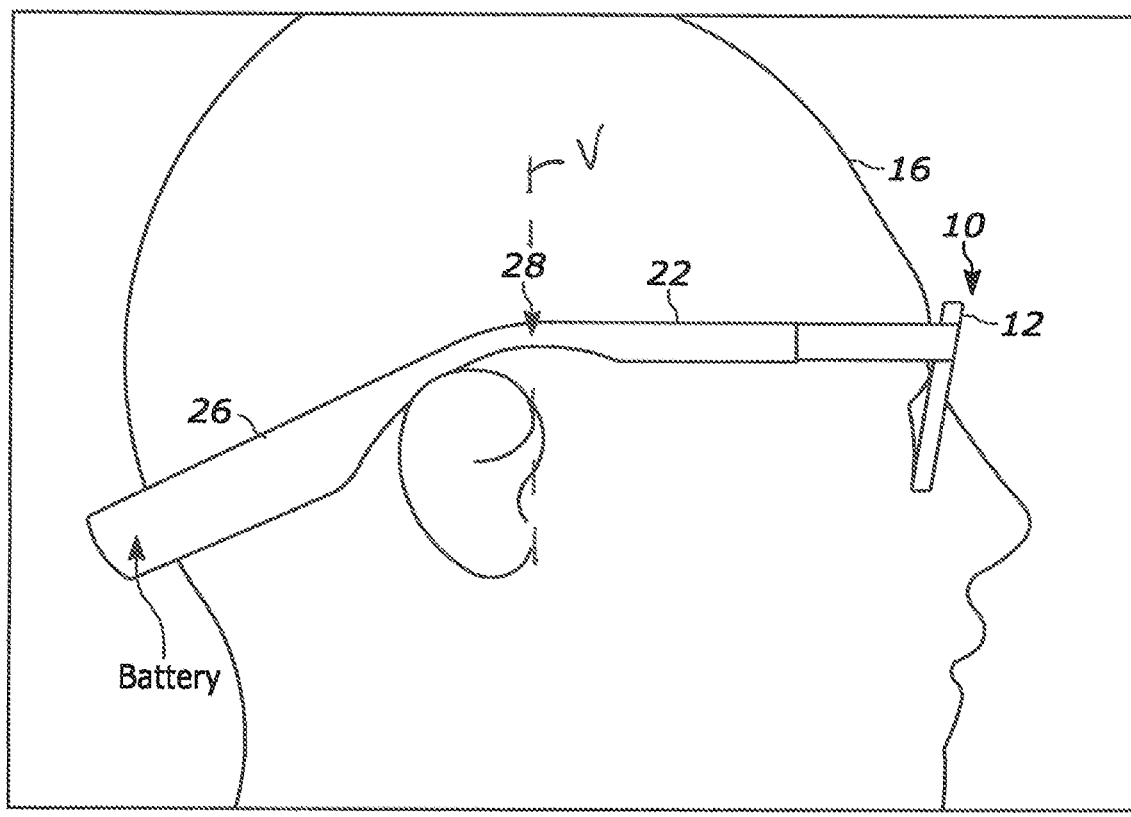
FIG. 1 illustrates an example augmented reality (AR) glasses being worn by a wearer.

This disclosure relates generally to computer ecosystems including aspects of consumer electronics (CE) device networks such as but not limited to devices useful for computer game networks and audio systems. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Figure 4:
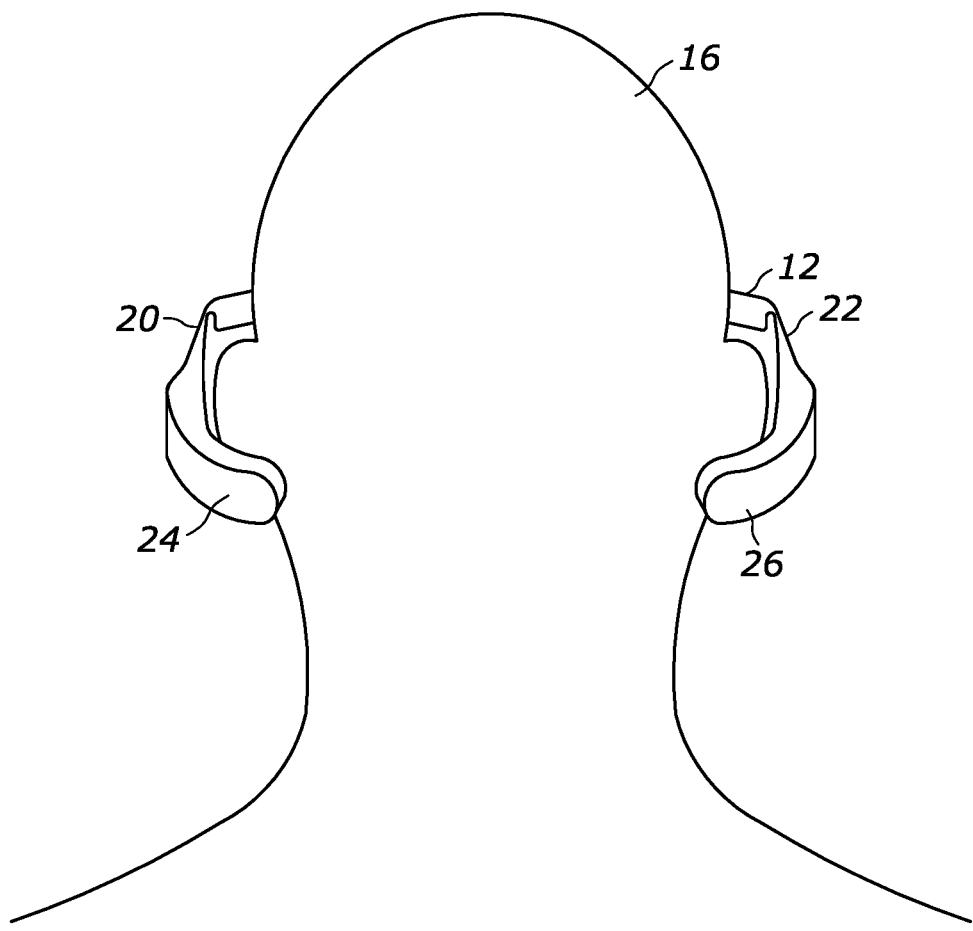
FIG. 4 illustrates the AR glasses from directly behind the wearer, with the temples in the wide configuration.
Figure 5:
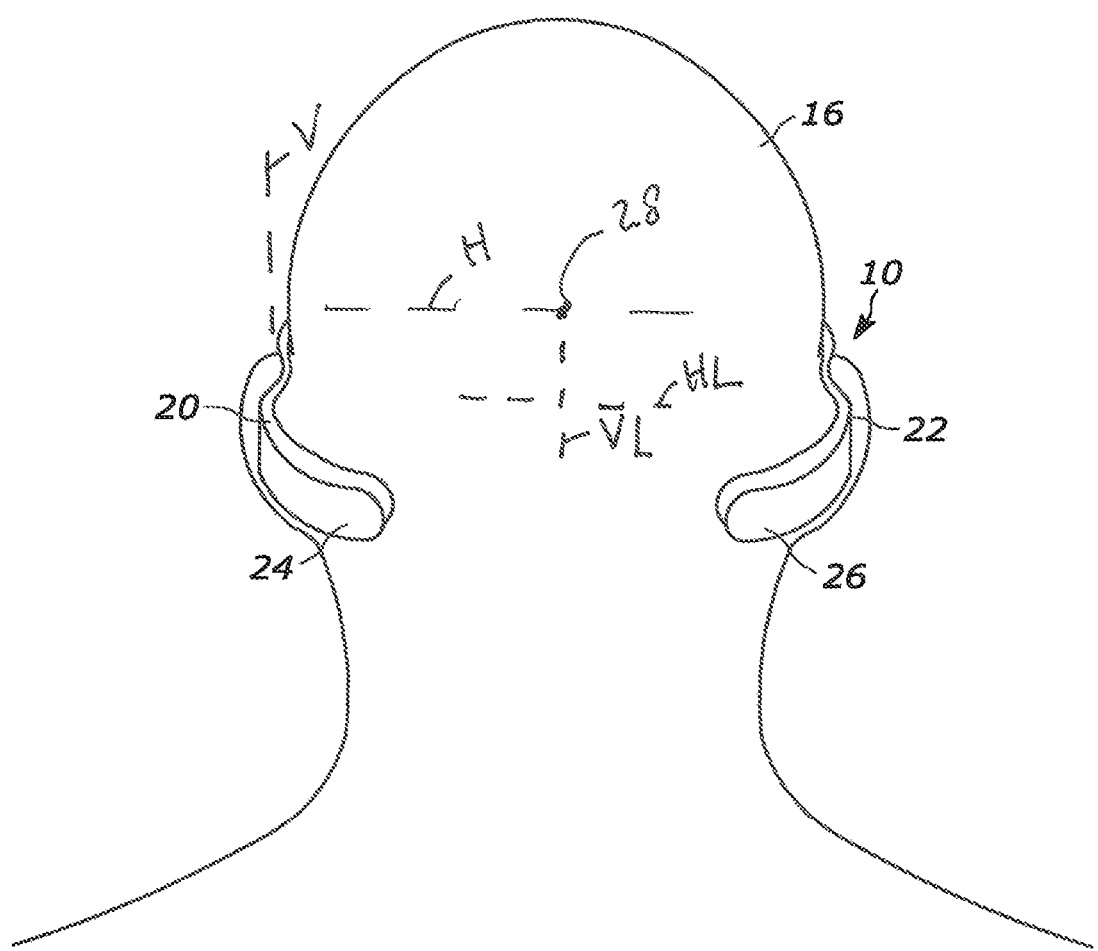
FIG. 5 illustrates the AR glasses from directly behind the wearer, with the temples in the narrow configuration.
Figure 6:
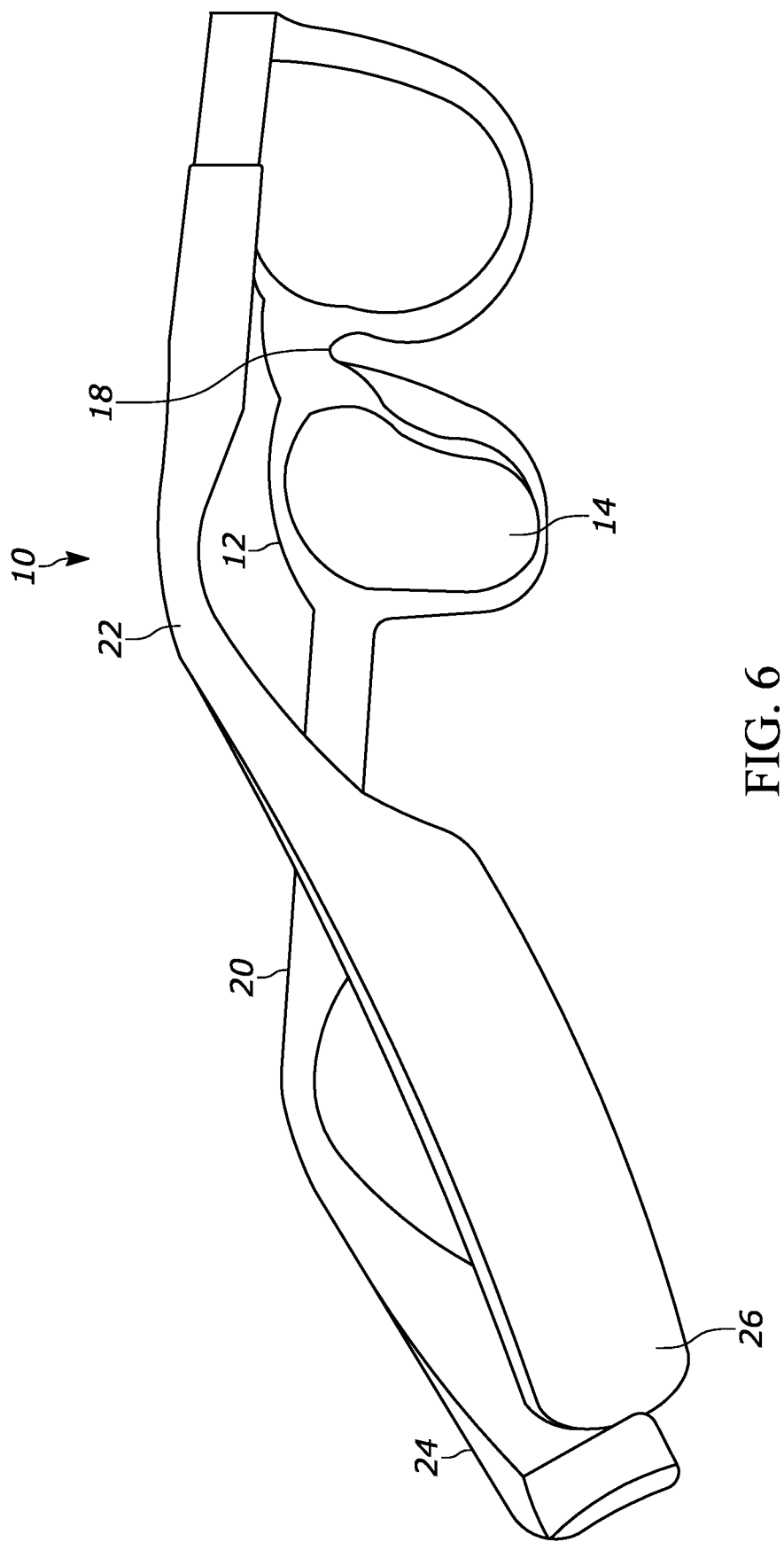
FIG. 6 illustrates a perspective view of the AR glasses.

Referring initially to FIGS. 1-6, augmented reality (AR) glasses 10 include a frame 12 holding left and right lenses 14 that may be AR lenses, i.e., lenses against which images of virtual objects can be projected to appear as if overlaid on real world objects that a wearer 16 can see through the lenses. As best shown in FIG. 6, the lenses 14 may be separated from each other by a nose bridge 18 configured to fit on the nose of the wearer 16.

Extending back along the head of the wearer 16 are left and right temples 20, 22. The temples 20, 22 extend over and past the respective ears of the wearer. Indeed, the temples include respective rear segments 24, 26 extending well behind the ears of the wearer to establish a center of gravity (CG) 28 of the glasses that, as shown best in FIG. 1, is approximately vertically above the front portion of the ears of the wearer. More formally, a horizontal line H (FIG. 5) passing through the CG 28 is located superior to the ears in a vertical line V (FIGS. 1 and 5) defined by the horizontal line passing through the CG and a portion of the ear of the wearer, in the example shown, the opening of the ear canal. Stated differently, the CG 28 is in a vertical line VL (FIG. 5) that is between the ears and that is above a horizontal line HL passing through the ears of the wearer.

As shown in FIGS. 1-5, the rear segments 24, 26 are curved to generally match the curve of the skull and extend posteriorly on the wearer generally along the base of the skull. At their posterior ends the rear segments 24, 26 are separated from each other, it being understood that in some embodiments the rear segments 24, 26 may join each other directly behind the head of the wearer.

Figure 2:
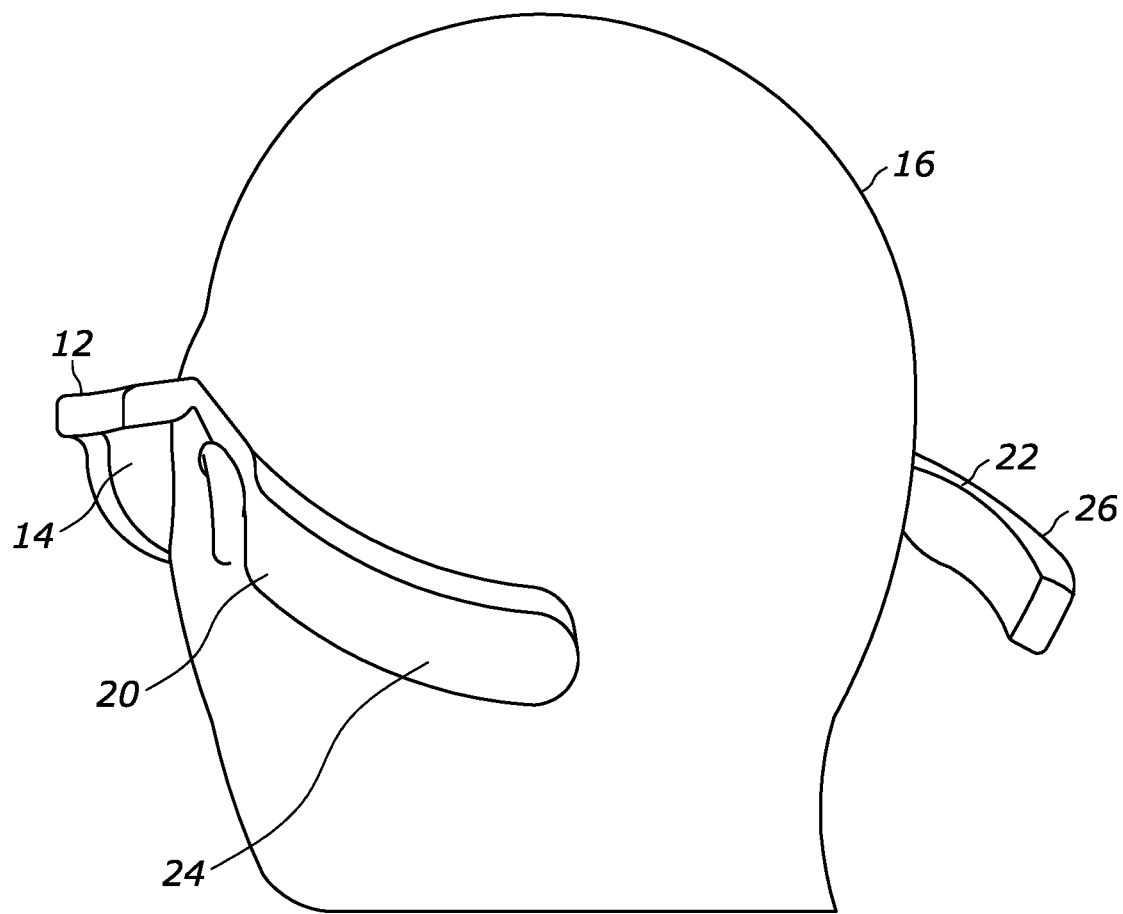
FIG. 2 illustrates the AR glasses from the side and behind the wearer, with the temples in the wide configuration.
Figure 3:
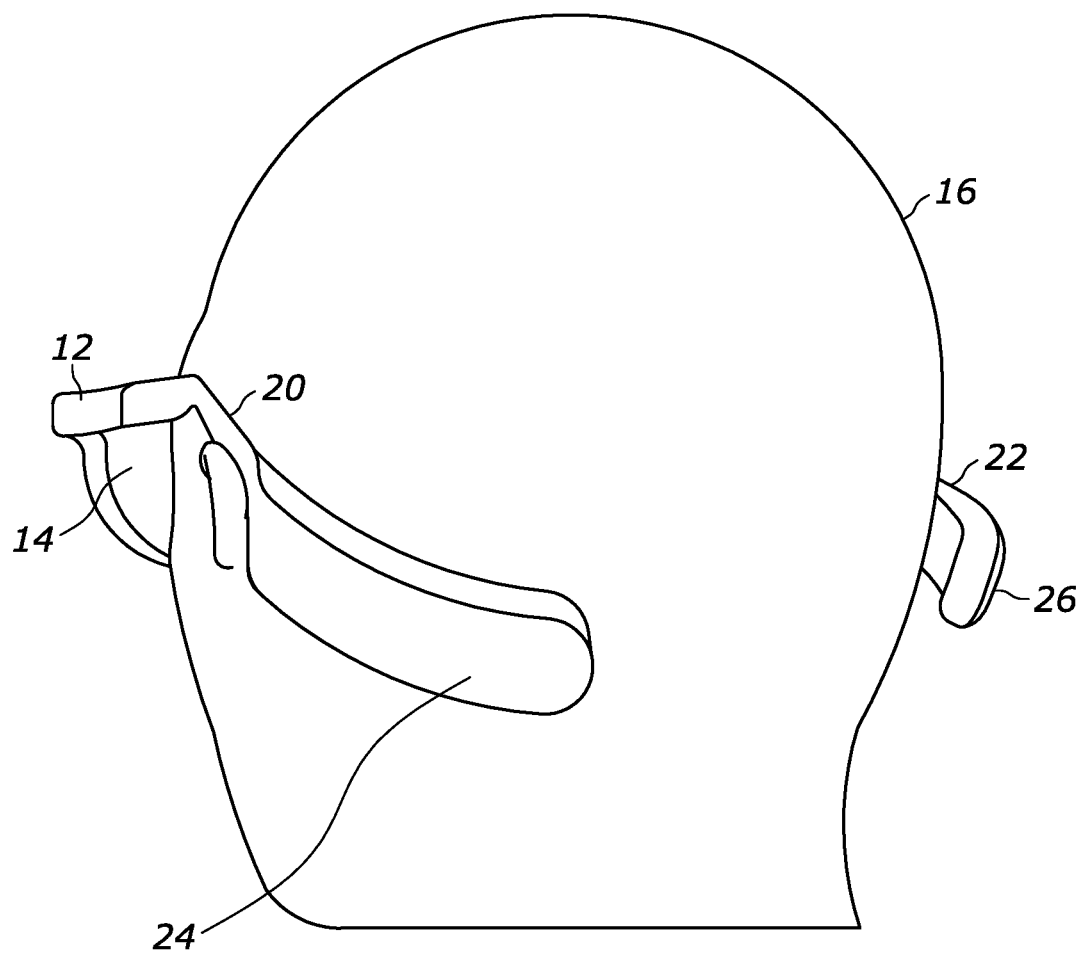
FIG. 3 illustrates the AR glasses from the side and behind the wearer, with the temples in the narrow configuration.

FIGS. 2 and 4 illustrate the temples 20, 22 being pivoted laterally from joints, described further below, that are near the frame 12. FIGS. 3 and 5 illustrate the temples 20, 22 being pivoted back from the joints medially to more closely conform to the head of the wearer.

Figure 7:
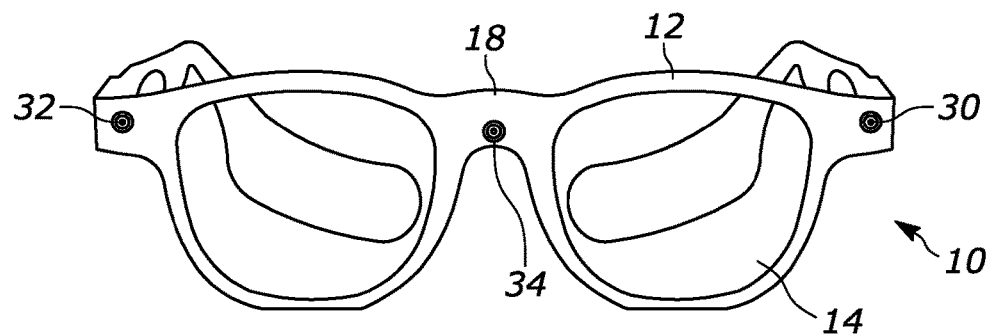
FIG. 7 illustrates a front view of the AR glasses.
Figure 8:
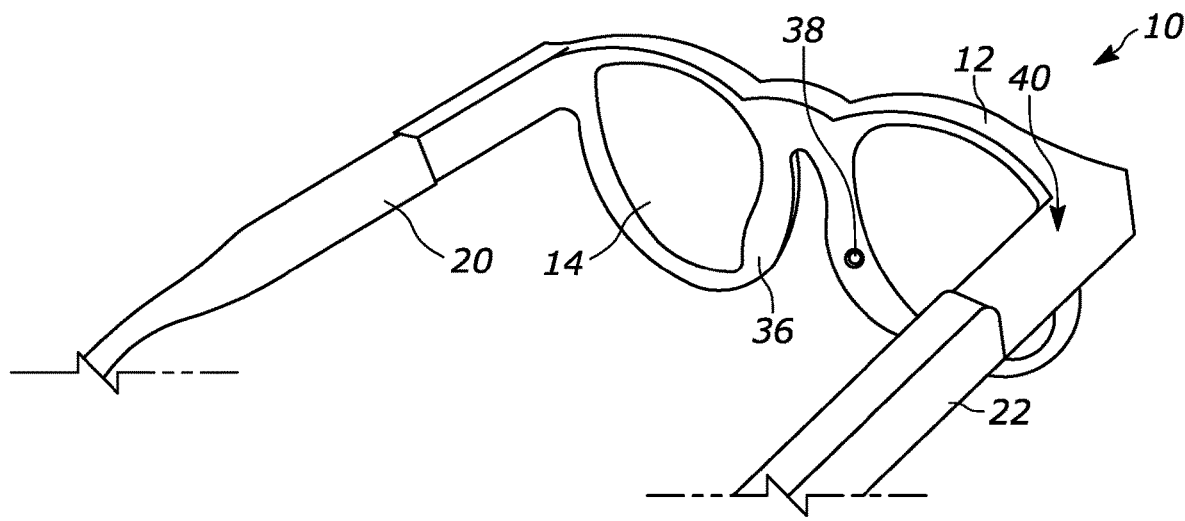
FIG. 8 illustrates another perspective view showing components of the AR glasses schematically.

Turn now to FIGS. 7 and 8. As shown in FIG. 7, on the anterior surface of the frame 12 and lateral to the lenses 14, outwardly-looking left and right imagers 30, 32 may be mounted. A third imager 34 may be mounted on the nose bridge 18, also looking outwardly. The three imagers 30-34 may be red-green-blue (RGB) cameras that may be used for, e.g., simultaneous localization and mapping (SLAM) and hand tracking, essentially inputting their images to an AR processor located on the glasses 10 or in a computer simulation console, for instance, via wireless communication paths.

FIG. 8 illustrates that on the posterior surface of the frame 12 adjacent the nose bridge 18 left and right imagers 36, 38 may be mounted. The left and right imagers 36, 38 may be infrared (IR) cameras used for tracking the eyes of the wearer 16. Also, in one or both of the temples (the right temple 22 in the example shown), a display engine 40 may be mounted. The display engine 40 may include a projector and processing circuitry, including a processor and appropriate data storage. The display engine 40 is configured to project images of virtual objects onto the lenses 14, and may be positioned as shown just posterior to the frame 12 on the anterior-most segment of the temple.

Figure 9:
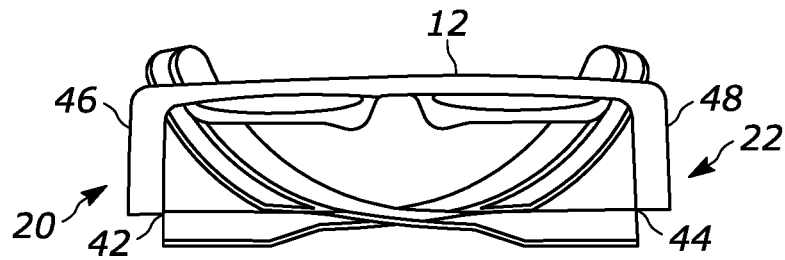
FIGS. 9 and 10 illustrate top and front views, respectively, of the AR glasses in the folded configuration.
Figure 10:
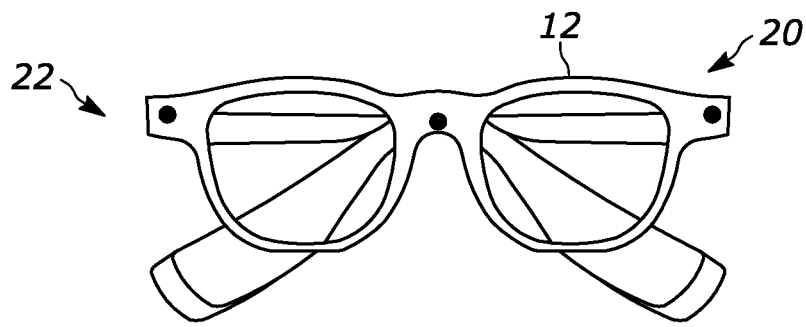

FIGS. 9 and 10 illustrate the temples 20, 22 can be folded medially to a collapsed configuration in which the temples are generally parallel to the frame 12. As best shown in FIG. 9, the temples are folded at respective hinge joints 42, 44 that are located at posterior ends respective anterior-most segments 46, 48 of the temples 20, 22 and thus that are located posterior to the frame 12.

Figure 11:
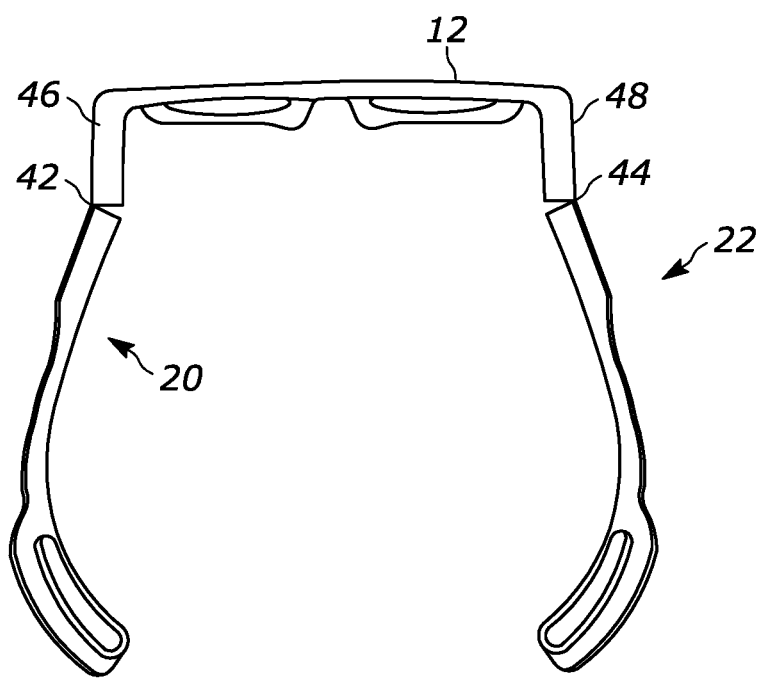
FIG. 11 illustrates a top view of the AR glasses in the wide configuration.

FIG. 11 illustrates that the hinge joints 42, 44 also permit limited lateral hinging of the temples 20, 22, e.g., about twenty degrees (20°) to achieve the configuration shown in FIGS. 2, 4, and 11 for greater ease and comfort for certain wearers.

Figure 12:
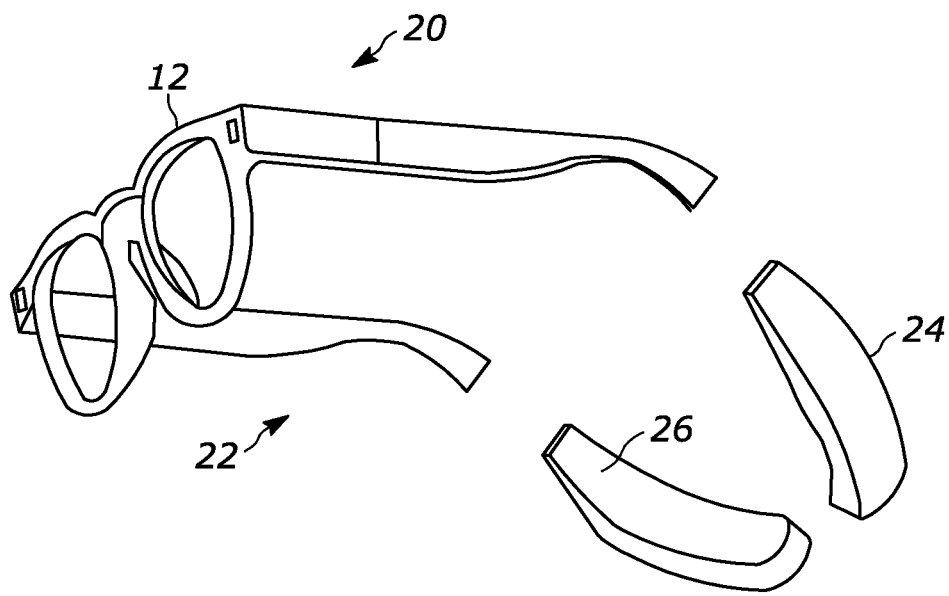
FIG. 12 illustrates the AR glasses with the rear detachable portions in an exploded relationship to indicate detachment.

FIG. 12 illustrates that in some examples, the rear segments 24, 26 may be detached from the more anterior part of the temples 20, 22 and may be re-engaged with the more anterior part. In one example, magnetic attachment is used. For instance, small magnets may be embedded in the anterior part of each rear segment 24, 26 to couple with one or more magnets in the more anterior parts of the temples 20, 22. Electrical connectivity between one or more components in the rear segments 24, 26 and one or more components in the more anterior parts of the AR glasses 10 also may be afforded through this coupling, since the detachable rear segments 24, 26 may include one or more electrical components.

Figure 13:
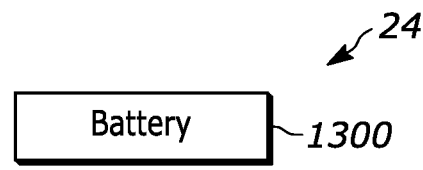
FIGS. 13-15 illustrate example internal components of embodiments of the rear detachable portions.
Figure 14:
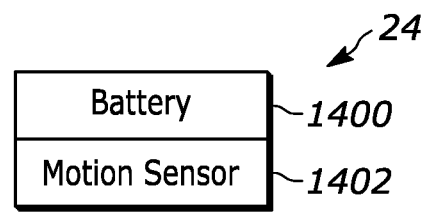
Figure 15:
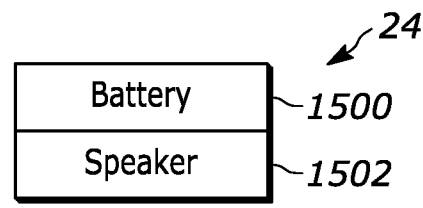

FIGS. 13-15 illustrate further, using the left rear segment 24 as an example, it being understood that the right rear segment 26 may be similarly configured to any of the configurations shown in FIGS. 13-15. In FIG. 13, at least one battery 1300, which may be, e.g., a primary battery or a rechargeable battery, is disposed in the rear segment 24. In FIG. 14, the rear segment 24 holds both at least one battery 1400 and at least one motion sensor 1402 such as but not limited to a gyroscope, magnetometer, accelerometer, and/or an inertial measurement unit (IMU) that typically includes a combination of accelerometers, gyroscopes, and magnetometers. In FIG. 15, the rear segment 24 holds both at least one battery 1500 and at least one speaker 1502 such as a bone-conduction speaker. It will readily be appreciated that the electrical component configuration of the AR glasses 10 may be established or changed as desired by providing the appropriate rear segment of a temple.

While the particular embodiments are herein shown and described in detail, it is to be understood that the subject matter which is encompassed by the present invention is limited only by the claims.

What is claimed is:

1. An assembly, comprising:
   a frame;
   left and right augmented reality (AR) lenses supported by the frame;
   left and right temples extending posteriorly from the frame to posterior ends that, when the assembly is worn on the head of a wearer, are posterior to the ears of the wearer such that a horizontal line through the center of gravity (CG) of the assembly is located superior to the ears and passes through a vertical line passing through one of the ears.

2. The assembly of claim 1, wherein each temple comprises a respective rear segment curved to generally match a curve of the skull of the wearer, and when the assembly is worn on the head of the wearer extend posteriorly on the wearer generally along the base of the skull.

3. The assembly of claim 2, wherein each rear segment defines a respective posterior end, and the posterior ends are separated from each other.

4. The assembly of claim 2, wherein each rear segment defines a respective posterior end, and the posterior ends are joined to each other.

5. The assembly of claim 1, wherein each temple is hinged at a respective joint to pivot laterally to a wide configuration and to pivot medially to a narrow configuration in which when the assembly is worn by the wearer, the temples are closely juxtaposed to the skull of the wearer.

6. The assembly of claim 5, wherein each joint is located at a respective posterior end of a respective anterior-most segment of a respective temple.

7. The assembly of claim 1, wherein each temple comprises a respective rear segment and wherein each rear segment is detachably engaged with a respective anterior part of the respective temple.

8. The assembly of claim 7, wherein magnetic attraction is used to connect each respective rear segment to the respective anterior part.

9. The assembly of claim 7, comprising at least one battery in at least one rear segment.

10. The assembly of claim 7, comprising at least one motion sensor in at least one rear segment.

11. The assembly of claim 7, comprising at least one speaker in at least one rear segment.

12. Augmented reality (AR) glasses comprising:
left and right temples which, when the AR glasses are worn by a wearer, extend behind the ears of the wearer to establish a center of gravity (CG) of the AR glasses that is in a vertical line between the ears and above a horizontal line passing through the ears of the wearer.

13. The AR glasses of claim 12, wherein each temple comprises a respective rear segment curved to generally match a curve of the skull of the wearer, and when the assembly is worn on the head of the wearer extend posteriorly on the wearer generally along the base of the skull.

14. The AR glasses of claim 13, wherein each temple is hinged at a respective joint to pivot laterally to a wide configuration and to pivot medially to a narrow configuration in which when the assembly is worn by the wearer, the temples are closely juxtaposed to the skull of the wearer.

15. The AR glasses of claim 14, wherein each joint is located at a respective posterior end of a respective anterior-most segment of a respective temple.

16. The AR glasses of claim 12, wherein each temple comprises a respective rear segment and wherein each rear segment is detachably engaged with a respective anterior part of the respective temple.

17. The AR glasses of claim 16, wherein magnetic attraction is used to connect each respective rear segment to the respective anterior part.

18. The AR glasses of claim 16, comprising at least one battery in at least one rear segment.

19. The AR glasses of claim 16, comprising at least one motion sensor and/or at least one speaker in at least one rear segment.

20. A method, comprising:
providing glasses wearable by a wearer and having left and right temples extending from a frame holding lenses; and
configuring the temples to establish a center of gravity (CG) of the glasses that is in a vertical line and above a horizontal line passing through the ears of the wearer when the glasses are worn by the wearer.

\* \* \* \* \*